United States Patent [19]

Takeuchi et al.

[11] Patent Number: 5,418,972
[45] Date of Patent: May 23, 1995

[54] PROTOCOL DATA GENERATOR-ANALYZER

[75] Inventors: Hideyuki Takeuchi, Tokyo; Yasutaka Ushijima, Fukuoka, both of Japan

[73] Assignee: NEC Corporation, Tokyo, Japan

[21] Appl. No.: 883,281

[22] Filed: May 14, 1992

[30] Foreign Application Priority Data

May 14, 1991 [JP] Japan .................................. 3-107732

[51] Int. Cl.⁶ .................................................. H04J 3/12
[52] U.S. Cl. ..................................... 395/800; 395/275; 395/325
[58] Field of Search ....................... 370/60, 85.2, 94.1; 358/147; 455/12.1; 395/275, 325, 500, 800

[56] References Cited

U.S. PATENT DOCUMENTS

| | | | |
|---|---|---|---|
| 4,631,666 | 12/1986 | Harris et al. | 395/325 |
| 4,677,611 | 6/1987 | Yanosy, Jr. et al. | 370/85.2 |
| 4,739,402 | 4/1988 | Maeda et al. | 358/147 |
| 4,965,771 | 10/1990 | Morikawa et al. | 395/275 |
| 5,008,952 | 4/1991 | Davis et al. | 455/12.1 |
| 5,182,748 | 1/1993 | Sakata et al. | 370/94.1 |
| 5,218,690 | 6/1993 | Boioli et al. | 395/500 |
| 5,251,205 | 10/1993 | Callon et al. | 370/60 |

Primary Examiner—Kevin J. Teska
Assistant Examiner—Dan Fiul
Attorney, Agent, or Firm—Foley & Lardner

[57] ABSTRACT

This protocol data generator-analyzer encodes and decodes protocol data units, which are transfer syntaxes used in data communications, for setting of or reference to the values as components of the protocol data units. First, table generation means generates, from an abstract syntax described according to an international standard specification as input data, a machine-processible table showing the data structure of the abstract syntax. For encoding of a protocol data unit, component data input means inputs the values of protocol data unit components. List generation/reference means generates a list having values corresponding to the data structure of the abstract syntax based on the values input by the component data input means during encoding, and converts the values to those referable using the list during decoding. Protocol data unit encoding/decoding means encodes sending protocol data units by inputting the table and list or decodes received protocol data units based on the table for list generation. Component data reference means refers to the values converted by the list generation/reference means based on the list generated by decoding of received protocol data units.

4 Claims, 6 Drawing Sheets

```
PDU ::= CHOICE {
        a  INTEGER,
        b  SEQUENCE {
               d  IA5String OPTIONAL,
               e  [0] BIT STRING,
               f  [1] IMPLICIT NULL
           },
        c  OCTET STRING
}
```

FIG.2B b { d "ABC" , e '101' B, f NULL }

FIG.5A b.d = "ABC"

b.e = '101' B b.f = NULL

FIG.5B

VAL1 = b.d

VAL2 = b.e

VAL3 = b.f

PROTOCOL DATA GENERATOR-ANALYZER

BACKGROUNDS OF THE INVENTION

1. Field of the Invention

This invention relates to a protocol data generator-analyzer, and particularly relates to a protocol data generator-analyzer to encode and decode PDUs (Protocol Data Units) in control and management of data structure required for data communications at the presentation layer of OSI (Open System Interconnection).

2. Description of the Prior Art

A conventional protocol data generator-analyzer of this kind requires setting of or reference to values constituting PDUs in encoding or decoding of PDUs, which are transfer syntaxes used in data communications.

For example, to encode a PDU, the engineer has to understand complicated data structure of an abstract syntax described according to an international standard ISO 8824 Specification of ASN. 1 (Abstract Syntax Notation One) before manually creating a VTL (Value Tree List) for PDU encoding, which is a machine-processible list containing values corresponding to the data structure so as to set or refer to the values of the components.

On the other hand, for decoding of a PDU, the engineer has to manually check the abstract syntax against the VTL output from the protocol data generator-analyzer so as to pick up desired component values.

As described above, a conventional protocol data generator-analyzer requires manual operation for encoding and decoding of PDUs. Specifically, the engineer has to understand the data structure of PDU before creation of or reference to a corresponding VTL. It is quite troublesome to set desired values and refer to them. Besides, manual setting and reference may be accompanied by errors in setting or reference and omissions of data when the data structure is complicated. Further, plenty of time and labor is required for understanding of the data structure itself.

SUMMARY OF THE INVENTION

An object of the present invention is to provide a protocol data generator-analyzer without such drawbacks as described above, which facilitates setting of and reference to values in encoding and decoding of PDUs and eliminates the need to be conscious of complicated data structure and thereby saving labor and preventing lack of information caused by errors in value setting and referencing.

According to a preferred embodiment of the present invention to attain this object, a protocol data generator-analyzer which encodes and decodes protocol data units, which are transfer syntaxes used in data communications, and sets and refers to the values as components of such protocol data units comprises table generation means to generate, from input data giving an abstract syntax described according to an international standard specification, a machine-processible table showing the data structure of the abstract syntax, component data input means to input values of protocol data unit components during encoding of a protocol data unit, list generation/reference means to generate a list having values corresponding to the data structure of the abstract syntax based on the values input by the component data input means or to convert the values in the list to referable values, protocol data unit encoding/decoding means to encode protocol data units to be sent using the table and list input or to decode received protocol data units based on the table for generation of the list, and component data reference means to refer to the values after conversion by the list generation/reference means according to the list generated through decoding of received protocol data units at the protocol data unit encoding/decoding means.

According to a preferred embodiment, the table showing the data structure of the abstract syntax comprises the attribute list representing the attribute of each component contained in the abstract syntax and the type tag list showing the type of components disposed in a tree structure. The attribute list of the table showing the data structure of the abstract syntax has a pointer to indicate the address of the brother attribute list if there is any brother attribute list, and the type tag list has a pointer to show the address of the child attribute list if there is any child attribute list.

According to another preferred embodiment, the list having values corresponding to the data structure is provided with cells for the components, and the length of the component and the address of memory storing the value are set at the cells.

According to still another preferred embodiment of the present invention to attain the above object, a protocol data generator-analyzer which encodes and decodes protocol data units, which are transfer syntaxes used in data communications, and sets and refers to the values as components of such protocol data units comprises table generation means to generate, from input data giving an abstract syntax described according to an international standard specification, a machine-processible table showing the data structure of the abstract syntax, list generation/reference means to generate a list having values corresponding to the data structure of the abstract syntax based on the input component values of the protocol data unit or to convert the values in the list to referable values, and protocol data unit encoding/decoding means to encode protocol data units to be sent using the table and list input or to decode received protocol data units based on the table for generation of the list.

Other objects, characteristics and effects of the present invention will be clarified in the detailed description below.

BRIEF DESCRIPTION OF THE DRAWINGS

FIG. 2 (A) is a diagram to show an example of abstract syntax described according to international standard ISO 8824, Specification of ASN.1.

FIG. 2 (B) is a diagram to show a description example of values for abstract syntax described according to international standard ISO 8824, Specification of ASN.1.

FIG. 5 (A) is a diagram to show setting statements for the value set by the component data input means.

FIG. 5 (B) is a diagram to show reference statements for the value referred to by the component data reference means.

DESCRIPTION OF THE PREFERRED EMBODIMENT

Figure 1:
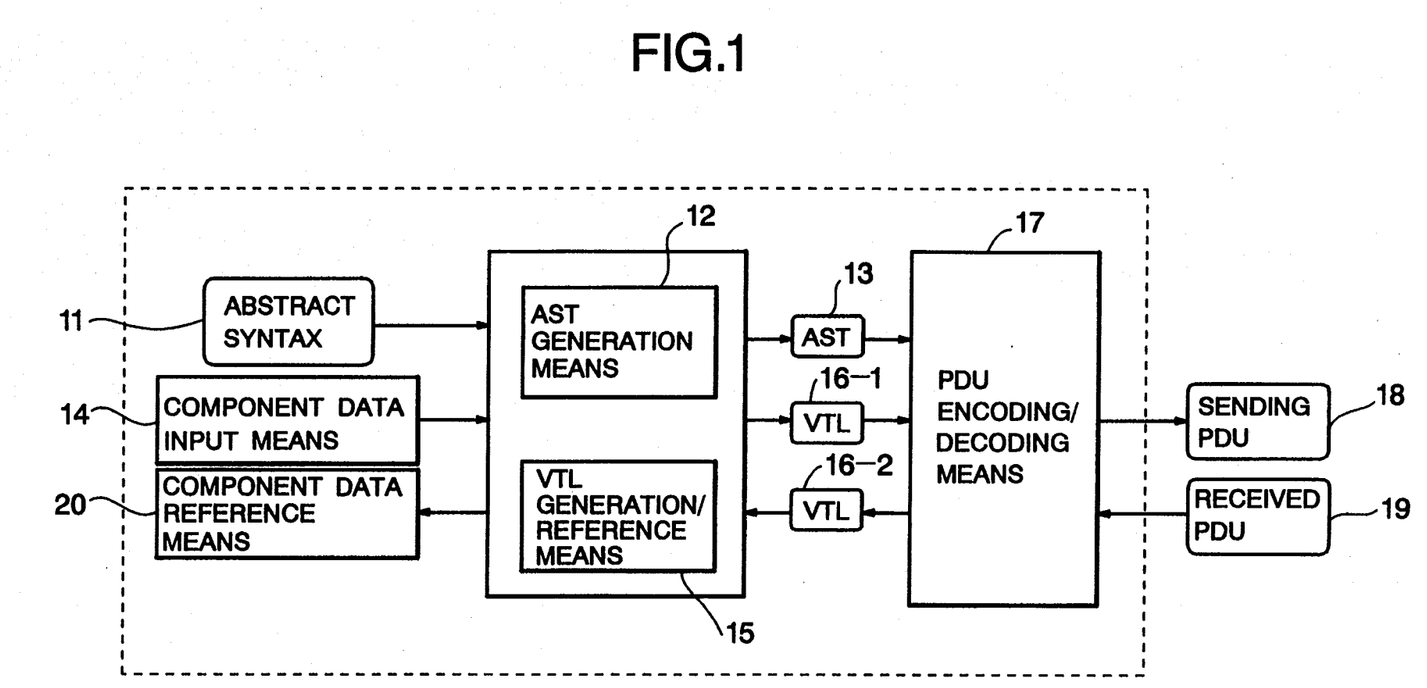
FIG. 1 is a block diagram to show the configuration of a protocol data generator-analyzer of an embodiment according to the present invention.

Referring to FIGS. 1 to 7, a preferred embodiment of the present invention is described below. FIG. 1 shows the configuration of a protocol data generator-analyzer according to an embodiment of the present invention.

In FIG. 1, a protocol data generator-analyzer according to an embodiment of the present invention comprises an AST generation means 12 to generate AST (Abstract Syntax Table) 13, which is a data structure table, from an abstract syntax 11 described according to an international standard ISO 8824 Specification of ASN. 1, component data input means 14 to input component values of PDU (Protocol Data Unit), which is a transfer syntax in data communications, VTL generation/reference means 15 to generate VTL, which is a table containing values corresponding to AST 13 based on the values of PDU components to convert them to values referable using the applicable list, a PDU encoding/decoding means 17 to encode sending PDU 18 or decode received PDU 19 according to AST and a component data reference means 20 to refer to the values obtained from VTL through conversion by the VTL generation/reference means 15 using a reference statement.

Figure 2A:
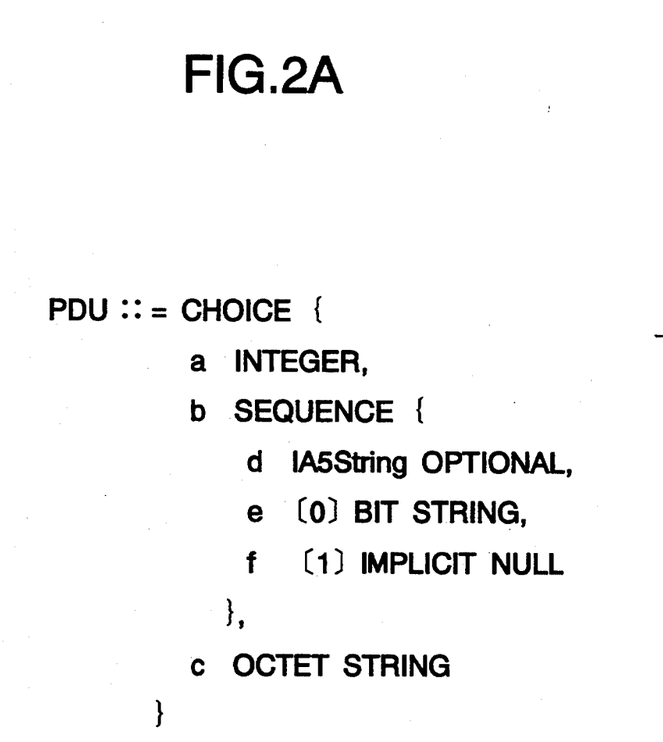
Figure 2B:
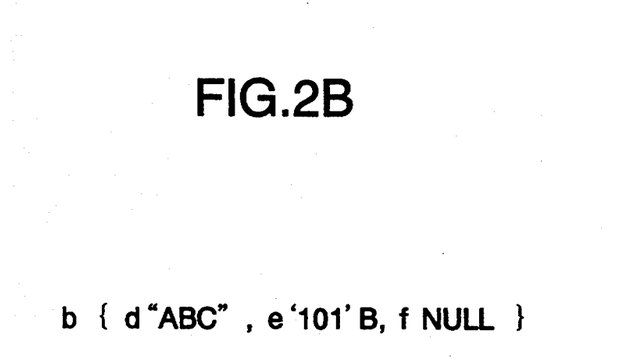

FIG. 2 (A) shows an example of an abstract syntax described according to an international standard ISO 8824 Specification of ASN. 1. FIG. 2 (B) shows an example of another description of abstract syntax 11 given in FIG. 2 (A).

The abstract syntax 11 shown in FIG. 2 (A) is a syntax to represent the data structure of a transfer syntax PDU used in data communications. In this abstract syntax 11, the components in capital letters are, except for "PDU" to indicate the name of the syntax, reserved words given in international standard ISO 8824 Specification of ASN. 1. Among the reserved words, "CHOICE", "SEQUENCE", "INTEGER", "OCTET STRING", "IA5String", "BIT STRING" and "NULL" represent the type, while "OPTIONAL" and "IMPLICIT" represent the attribute of the components.

The reserved word "CHOICE" is used for description of selectable elements. It means that only one out of those placed between "{" and "}" is the element which actually specifies the value. In this abstract syntax 11, identifiers "a", "b" and "c" are selectable elements. The reserved word "SEQUENCE" is to show a structural type. It means that the components placed between "{" and "}" must be in the order as they are. In this abstract syntax 11, identifiers "d", "e" and "f" are such components.

The reserved word "INTEGER" is to show that this PDU is of integer type and can specify integers only. The reserved word "OCTET STRING" shows that the PDU is of octet type. "IA5String" represents a type of character strings, which is almost the same as those generally called the ASCII character string. The reserves word "BIT STRING" means that the PDU is of bit string type. "NULL" means that the PDU is of null type and has no value in particular.

The reserved word "OPTIONAL" shows an attribute of the element and means that the element can be omitted. In this abstract syntax 11, IA5String, which is an element of "d", is omissible. The reserved word "IMPLICIT" is to show another attribute of the element and means that the identifier representing the type is omitted. In this abstract syntax 11, the identifier (05) of "NULL", which is an element of "f", is omitted.

Figure 3:
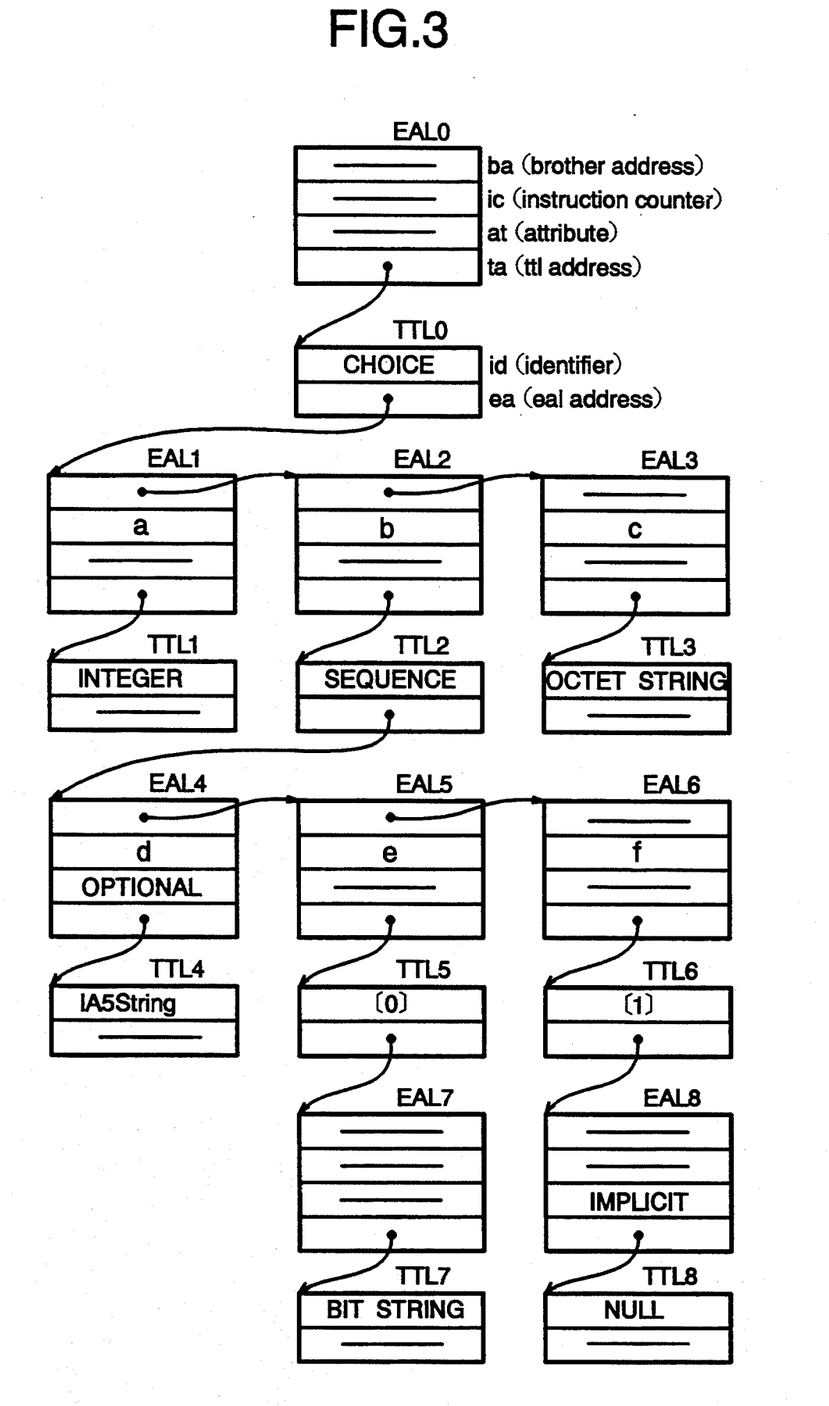
FIG. 3 is a diagram to shown an example of AST, which represents the data structure of an abstract syntax.

FIG. 3 shows an example of AST representing the data structure of the abstract syntax 11. The AST in FIG. 3 consists of the components of the abstract syntax 11 classified into EAL (Element Attribute List) and TTL (Type Tag List) and disposed in a tree structure. EAL represents the attribute, and TTL represents the type for the components contained in the abstract syntax 11.

When there's a brother EAL, the pointer to that EAL is set at "ba" (brother address) of EAL. At "ic" (instruction counter), identifiers such as "a" and "b" for components of the abstract syntax 11 are set. At "at" (attribute), reserved words representing attributes such as "OPTIONAL" and "IMPLICIT" are set. At "ta" (ttl address), the pointer to TTL of the corresponding type is set.

For TTL, reserved words representing the type is set at "id" (identifier) and, if the reserved word given at "id" has any elements, the pointer to the child EAL representing such elements is set at "ea" (eal address).

As described above, tabulation of the data structure with classifying them into EAL and TTL serves for reduction in memory. Specifically, since each EAL is provided with "ta" for child TTL pointer, if a plurality of EALs have a common TTL, it is sufficient to set a pointer to that common TTL at "ta" of each EAL. This eliminates the need of TTL contents at each EAL, and reduces the memory size required for AST creation.

Figure 4:
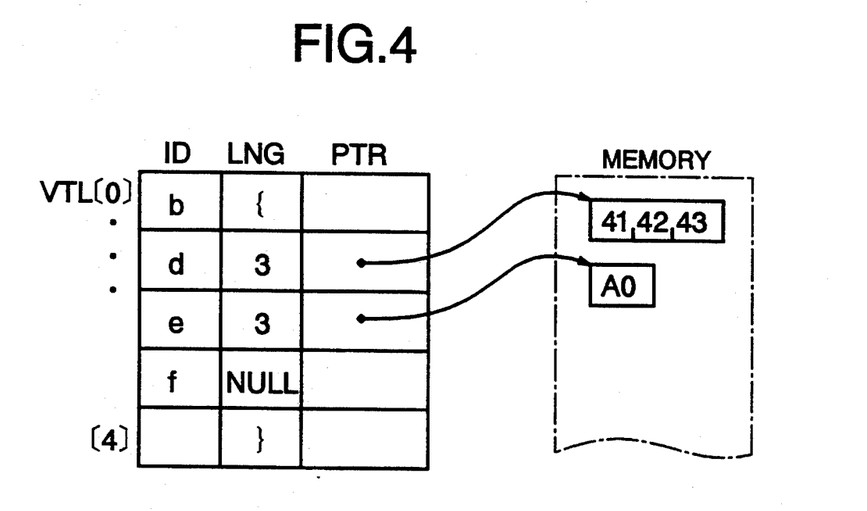
FIG. 4 is a diagram to show an example of VTL input to or output from the VTL generation/reference means.

FIG. 4 shows an example of VTL, which is input to or output from the VTL generation/reference means 15. The lines with the VTL line numbers VTL (0) to VTL (4) are divided into three cells. At the cell I D (identifier), identifiers "b", "d", "e" and "f" are set to identify the components. The cell LNG (length) has the length of the components and the cell PTR (pointer) holds the address of the memory storing the component values. In the example given in the figure, the memory address given by the cell PTR for the identifier "d" stores the code representing the value "ABC" according to the basic encoding rules under the international standard ASN.1. The memory address shown by the cell PTR of the identifier "e" stores the code representing one byte of bit string "10100000".

Figure 5A:
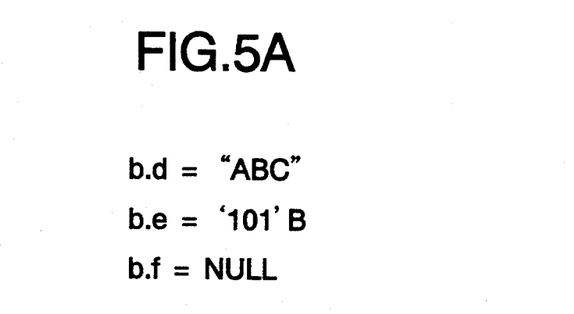
Figure 5B:
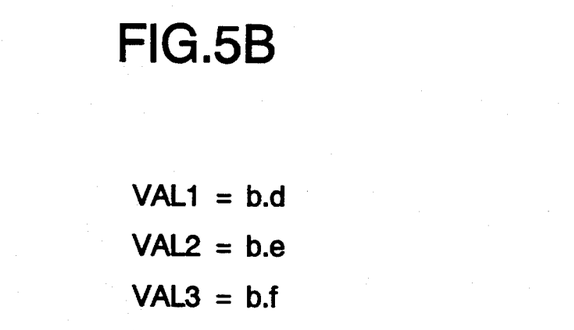

FIG. 5 (A) shows an example of value setting at the component data input means 14. FIG. 5 (B) shows an example of value reference statement at the component data reference means 20.

Figure 6:
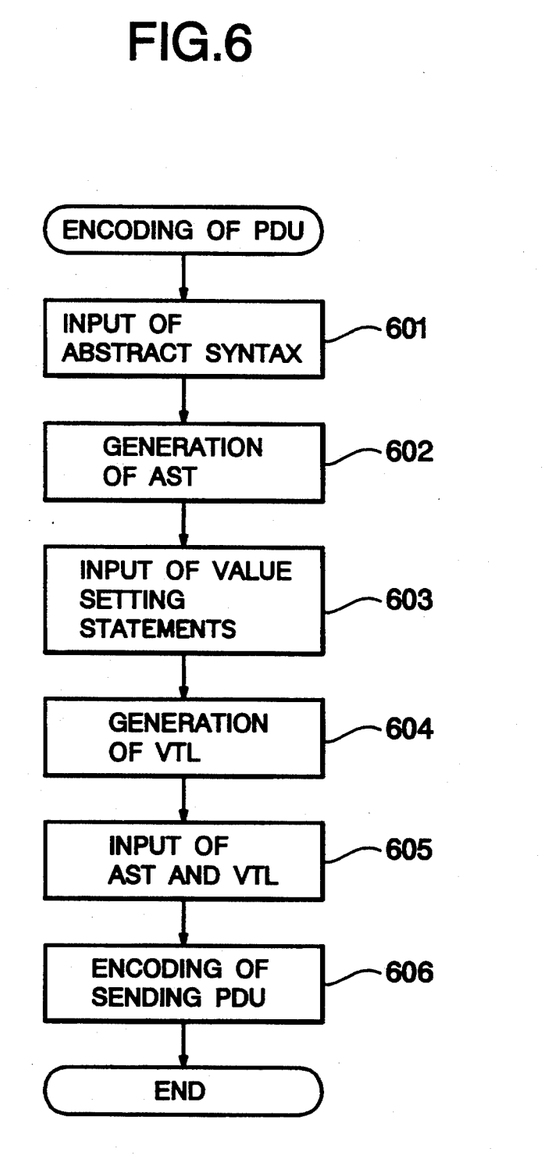
FIG. 6 is a flowchart to show the flow of PDU encoding process by the protocol data generator-analyzer according to this embodiment.
Figure 7:
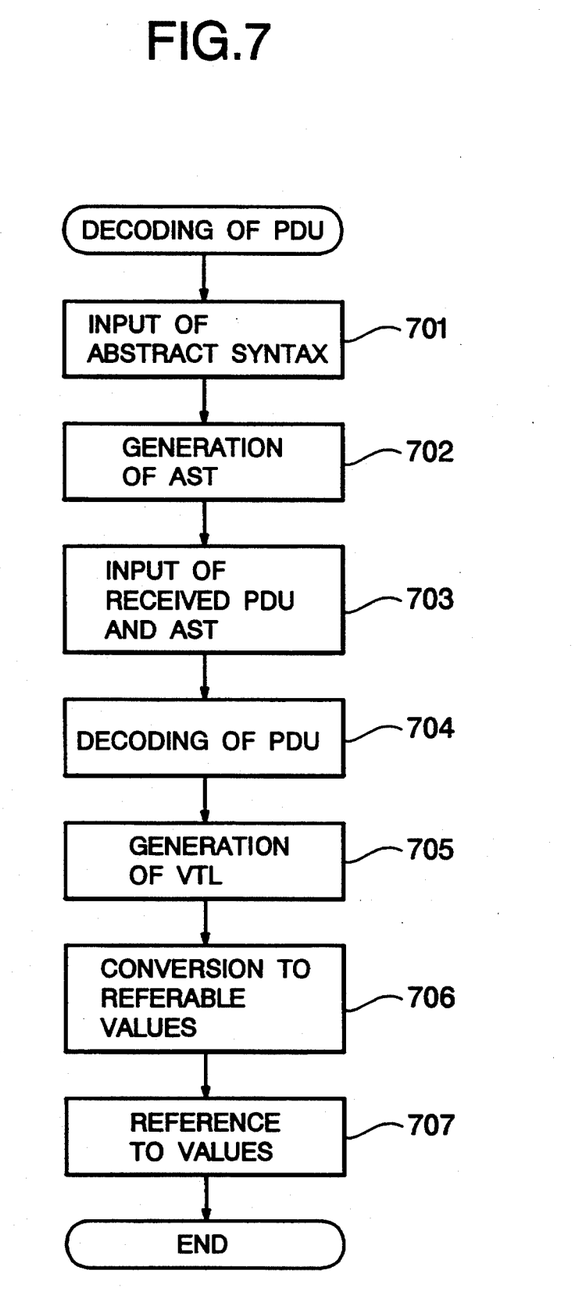
FIG. 7 is a flowchart to show the flow of PDU decoding process by the protocol data generator-analyzer according to this embodiment.

Now, referring to FIGS. 6 and 7, encoding and decoding of PDU by the protocol data generator-analyzer according to this embodiment is described.

First, referring to FIG. 6, encoding of PDU where the description of values in FIG. 2 (B) is given to the abstract syntax in FIG. 2 (A) is explained. The AST generation means 12 inputs the abstract syntax in FIG. 2 (A) (Step 601) and generates AST 13 as shown in FIG. 3 (Step 602).

Setting statements representing the element values in FIG. 5 (A) corresponding to FIGS. 2 (A) and 2(B), which are b.d="abc", b.e ='101'B and b.f=NULL, are input from the component data input means 14 (Step 603). Then, the VTL generation/reference means 15 generates VTL 16-1 in the form shown in FIG. 4 based on the data structure shown in FIG. 2 (A) (Step 604). Now, AST 13 generated by the AST generation means 12 and VTL 16-1 generated by the VTL generation/reference means 15 are input to the PDU encoding/decoding means 17 (Step 605) where they are encoded according to the basic encoding rules ISO 8825 under the international standard ASN.1 (Step 606) and output as the sending PDU 18.

Next, referring to FIG. 7, PDU decoding process where the description of values in FIG. 2 (B) is given to the abstract syntax in FIG. 2 (A). The AST generation means 12 inputs the abstract syntax in FIG. 2 (A) (Step 701) and generates AST 13 as shown in FIG. 3 (Step 702). The PDU encoding/decoding means 17 inputs received PDU 19 and AST 13 generated by the AST generation means 12 (Step 703), decodes them based on AST 14 as specified in the basic encoding rules ISO 8825, which is an international standard for ASN.1 (Step 704), and outputs VTL 16-2 in the form as shown in FIG. 4 (Step 705). Then, the VTL generation/reference means 15 inputs VTL 16-2 output from the PDU encoding/decoding means 17 and converts it to the set value (Step 706). The component data reference means 20 refers to the value converted from VTL 16-2 by the VTL generation/reference means 15 according to the value reference statements VAL1=b.d, VAL2=b.e and VAL3=b.f shown in FIG. 5 (B) (Step 707).

As described above, the protocol data generator-analyzer according to the present invention facilitates setting and reference of values and eliminates the need to be conscious of complicated data structure, by describing the component values in using assignment statements with identifiers such as "b", "d", "e" and "f" for abstract syntaxes in encoding and decoding of PDU. Thus, this protocol data generator-analyzer successfully serves for labor saving and effectively prevents lack of information due to errors in value setting or referencing.

It is understood that the present invention is not limited to the preferred embodiment described above and that many modifications can be made in the invention without departing from the spirit thereof. It is intended to cover in the appended claims all such modifications as fall within the true spirit and scope of the invention.

What is claimed is:

1. A protocol data generator-analyzer for generating, inputting and making reference to data as a component of a protocol data unit upon assembling and disassembling an abstract syntax, in which a data structure is defined by ISO8824 and an encoding rule is defined by ISO8825 into a transfer syntax, said protocol data generator-analyzer comprising:

AST generating means for generating an AST table which can process a data structure of said abstract syntax, in which said data structure is defined by ISO8824 and said encoding rule is defined by ISO8825;

component data inputting means for inputting data to be a component of a transmission protocol data unit upon assembling of said transmission protocol data unit;

component data referring means for making reference to said data to be a component of a reception protocol data unit upon disassembling said reception protocol data unit;

VTL generating and referring means for generating a first VTL table for storing and managing a component data of said transmission protocol data unit and for making a reference to a second VTL table for referring to a component data of said reception protocol data unit, said reception protocol data unit having structure of said AST table generated by said AST generating means; and protocol data unit assembling and disassembling means for:

assembling said transmission protocol data unit based on said first VTL table storing said component data corresponding to said data structure of said AST table and said first VTL table generated by said VTL generating and referring means with reference to said AST table generated by said AST generating means, and disassembling said reception protocol data unit based on said reception protocol data unit as an input thereto and with reference to said AST table generated by said AST generating means into said second VTL table for storing said component data of said reception protocol data unit corresponding to said data structure of said AST table.

2. A protocol data generator-analyzer as set forth in claim 1, wherein said AST table generated by said AST generating means comprises a type tag list (TTL) and an element attribute list (EAL), wherein:

said type tag list (TTL) further comprising:

a type tag identifier (ID) for managing an identifier corresponding to a data type of a component in said AST table, and an element attribute list (EA) for managing a pointer to a leading end of said EAL corresponding to said component in said AST table, said EAL (EAL) further comprising:

a brother address (BA) for managing a pointer to said EAL corresponding to a brother of said component in said AST table, an instruction counter (IC) for managing an identifier of said component in said AST table, an attribute type (AT) for managing an attribute of said component in said AST table, and a TTL-address (TA) for managing a pointer to said TTL corresponding to a child of said component in said AST table.

3. A protocol data generator-analyzer as set forth in claim 2, wherein said first VTL table and said second VTL table generated by said VTL generating and referring means, said first VTL table and said second VTL table comprising:

an identifier field (ID1), said ID1 storing and managing an identifier which manages said first VTL table and said second VTL table with said IC of said EAL for said component in said first VTL table and said second VTL table in order to make a data structure correspond to data structure in said AST table generated by said AST generating means, a cell length field (LNG), said LNG storing and managing a length of data of said component in said first VTL table and said second VTL table identified by said ID, and a cell pointer (PTR), said PTR storing and managing an address of a memory location storing said component in said first VTL table and said second VTL table, and said first VTL table and said second VTL table corresponding to said data structure of said AST table with said ID1, said LNG, and said PTR as a set.

4. A protocol data generator-analyzer as set forth in claim 3, wherein:

said protocol data generator-analyzer generates said AST table by said AST generating means and with said abstract syntax as input thereto, said first VTL table storing said component data corresponding to said AST table by said VTL generating and referring means and said component data corresponding to said data structure of said abstract syntax by said component data inputting means, said protocol data generator-analyzer assembles said transmission protocol data unit with reference to said AST table generated by said AST generating means and with reference to said first VTL table as input thereto, upon assembling of said transmission protocol data unit, said AST generating means generates said AST table with said abstract syntax as input thereto, said protocol data unit assembling and disassembling means disassembles said abstract syntax into said second VTL table with said reception protocol unit as input thereto with reference to said AST table, and said VTL generating and referring means analyzes said second VTL table for making reference to said component data of said second VTL table by said component data referring means.

* * * * *